United States Patent
Suzuki

(10) Patent No.: US 9,007,607 B2
(45) Date of Patent: Apr. 14, 2015

(54) IMAGE FORMING APPARATUS

(71) Applicant: Brother Kogyo Kabushiki Kaisha, Nagoya-shi, Aichi-ken (JP)

(72) Inventor: Masataka Suzuki, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 63 days.

(21) Appl. No.: 13/788,672

(22) Filed: Mar. 7, 2013

(65) Prior Publication Data
US 2013/0286418 A1   Oct. 31, 2013

(30) Foreign Application Priority Data

Apr. 27, 2012  (JP) .................................. 2012-102178
Feb. 5, 2013   (JP) .................................. 2013-020137

(51) Int. Cl.
*G06F 3/12* (2006.01)
*H04N 1/00* (2006.01)

(52) U.S. Cl.
CPC ................................. *H04N 1/00352* (2013.01)

(58) Field of Classification Search
CPC .................................................. H04N 1/00352
See application file for complete search history.

(56) References Cited

U.S. PATENT DOCUMENTS

| 2009/0046327 | A1* | 2/2009 | Sakai ............................. 358/471 |
| 2010/0053676 | A1* | 3/2010 | Sugimoto ..................... 358/1.15 |
| 2010/0103145 | A1  | 4/2010 | Terai |
| 2011/0007335 | A1* | 1/2011 | Kimoto et al. ............... 358/1.13 |

FOREIGN PATENT DOCUMENTS

| JP | H08-016296 A | 1/1996 |
| JP | 2004-070735 A | 3/2004 |

* cited by examiner

*Primary Examiner* — Fred Guillermety
*Assistant Examiner* — Bharatkumar Shah
(74) *Attorney, Agent, or Firm* — Merchant & Gould PC

(57) ABSTRACT

An image forming apparatus includes an image forming section, a displaying section, an in-screen operating section, an out-screen operating section, and a controller. The image forming section is configured to form an image on a sheet. The displaying section is configured to display an operation screen for image formation performed by the image forming section. The in-screen operating section is configured to accept a user's operation inside the operation screen displayed by the displaying section. The out-screen operating section is configured to accept the user's operation outside the operation screen displayed by the displaying section. The controller is configured to determine, based on a user's instruction, an operating section that accepts the user's operation from the in-screen operating section and the out-screen operating section.

15 Claims, 11 Drawing Sheets

FIG. 1
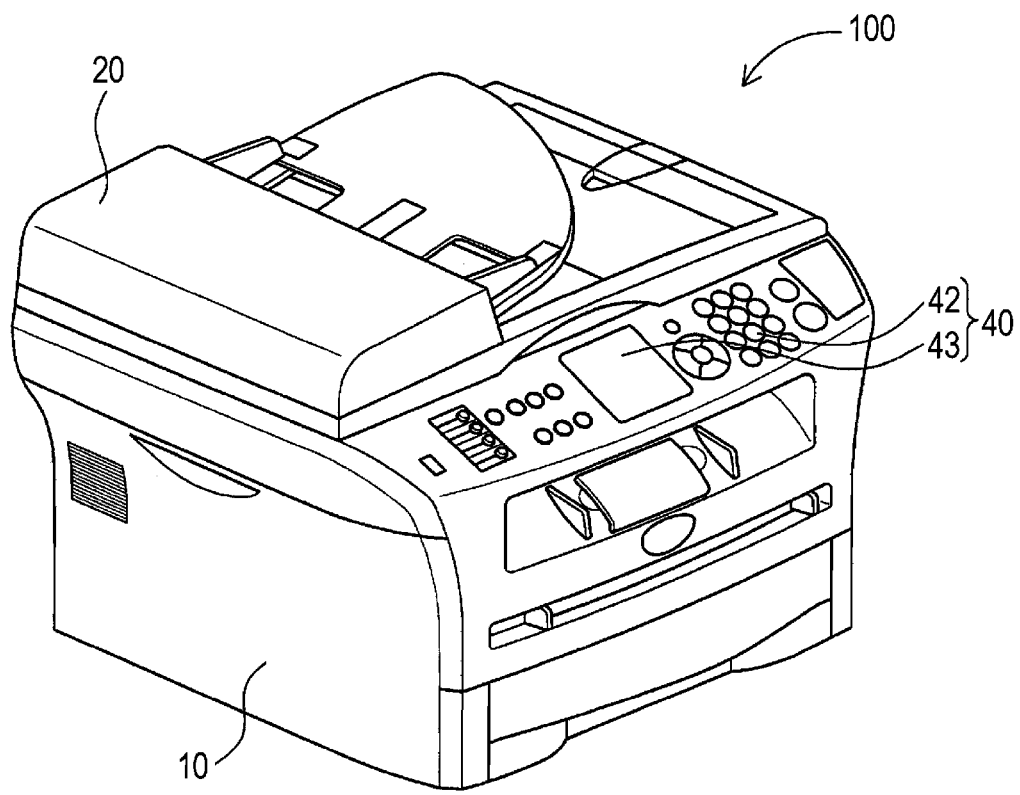
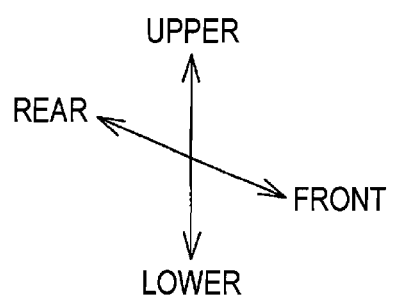

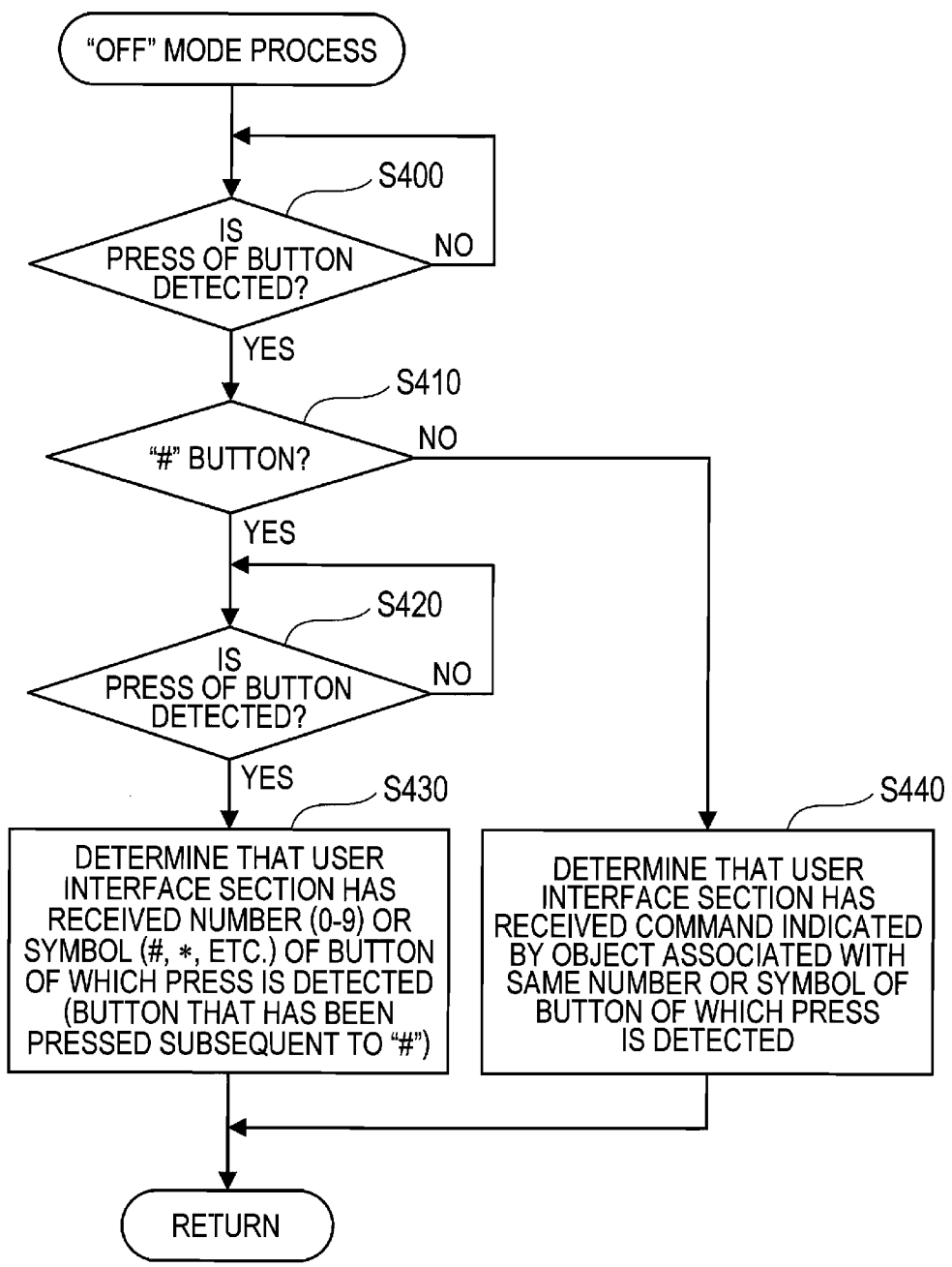

IMAGE FORMING APPARATUS

CROSS REFERENCE TO RELATED APPLICATIONS

This application claims priority from Japanese Patent Application No. 2012-102178 filed. Apr. 27, 2012 and No. 2013-020137 filed Feb. 5, 2013. The entire content of each of the priority applications is incorporated herein by reference.

TECHNICAL FIELD

The invention relates to an image forming apparatus and, more specifically, to an image forming apparatus that can accept user's operations in a plurality of operating sections.

BACKGROUND

Conventionally, it is well known that user's operations are accepted by a plurality of operating sections. The plurality of operating sections is, for example, a touch panel and numerical input buttons.

SUMMARY

Conventionally, however, operations that could be performed with the operating sections were limited. For example, only selection of functions could be performed with the touch panel, while only inputting of numbers could be performed with the numerical input buttons. On the other hand, it is known that all the operations could be performed with hardware keys only when a touch panel fails. In the above-described technology, however, it was impossible to use different operating sections at a user's convenience, which was inconvenient.

In view of the foregoing, it is an object of the invention to provide an image forming apparatus in which different operating sections can be used at a user's convenience.

In order to attain the above and other objects, the invention provides an image forming apparatus. The image forming apparatus includes an image forming section, a displaying section, an in-screen operating section, an out-screen operating section, and a controller. The image forming section is configured to form an image on a sheet. The displaying section is configured to display an operation screen for image formation performed by the image forming section. The in-screen operating section is configured to accept a user's operation inside the operation screen displayed by the displaying section. The out-screen operating section is configured to accept the user's operation outside the operation screen displayed by the displaying section. The controller is configured to determine, based on a user's instruction, an operating section that accepts the user's operation from the in-screen operating section and the out-screen operating section.

According to another aspect, the invention provides an image forming apparatus. The image forming apparatus includes an image forming section, a displaying section, an in-screen operating section, an out-screen operating section, and a controller. The image forming section is configured to form an image on a sheet. The displaying section is configured to display an operation screen for image formation performed by the image forming section. The in-screen operating section is configured to accept a user's operation inside the operation screen displayed by the displaying section. The out-screen operating section is configured to accept the user's operation outside the operation screen displayed by the displaying section. The controller is configured to determine whether a usage history of the operating section satisfies a predetermined condition and, based on a determination result, to determine the operating section that accepts the user's operation from the in-screen operating section and the out-screen operating section.

According to still another aspect, the invention provides an image forming apparatus. The image forming apparatus includes an image forming section, a displaying section, an in-screen operating section, an out-screen operating section, and a controller. The image forming section is configured to form an image on a sheet. The displaying section is configured to display an operation screen for image formation performed by the image forming section. The in-screen operating section is configured to accept a user's operation inside the operation screen displayed by the displaying section. The out-screen operating section is configured to accept the user's operation outside the operation screen displayed by the displaying section. The controller is configured to determine whether to execute a power saving mode and, based on a determination result, to determine the operating section that accepts the user's operation from the in-screen operating section and the out-screen operating section.

BRIEF DESCRIPTION OF THE DRAWINGS

Embodiments in accordance with the invention will be described in detail with reference to the following figures wherein:

FIG. 1 is a perspective view showing the appearance of an MFP according to a first embodiment of the invention;

FIG. 15 is a flowchart showing the procedure of an "OFF" mode process according to the second embodiment.

DETAILED DESCRIPTION

Hereinafter, an image forming apparatus according to a first embodiment of the invention will be described while referring to FIGS. 1 through 9. The image forming apparatus of the present embodiment is applied to an MFP (Multi Function Peripheral) having a facsimile transmission/reception function, a scanner function, and a copy function.

<Configuration of MFP>

As shown in FIG. 1, an MFP 100 of the present embodiment includes an image forming section 10 (an example of an image forming section) that prints an image on a sheet, and an image reading section 20 that reads an image on an original document. Note that the image forming method of the image forming section 10 may be an electro-photographic method or an inkjet method. Also, the image forming section 10 may be capable of forming both color and monochromatic images, or may be capable of forming only monochromatic images. Further, the image reading section 20 may be capable of reading both color and monochromatic images, or may be capable of reading only monochromatic images.

Figure 2:
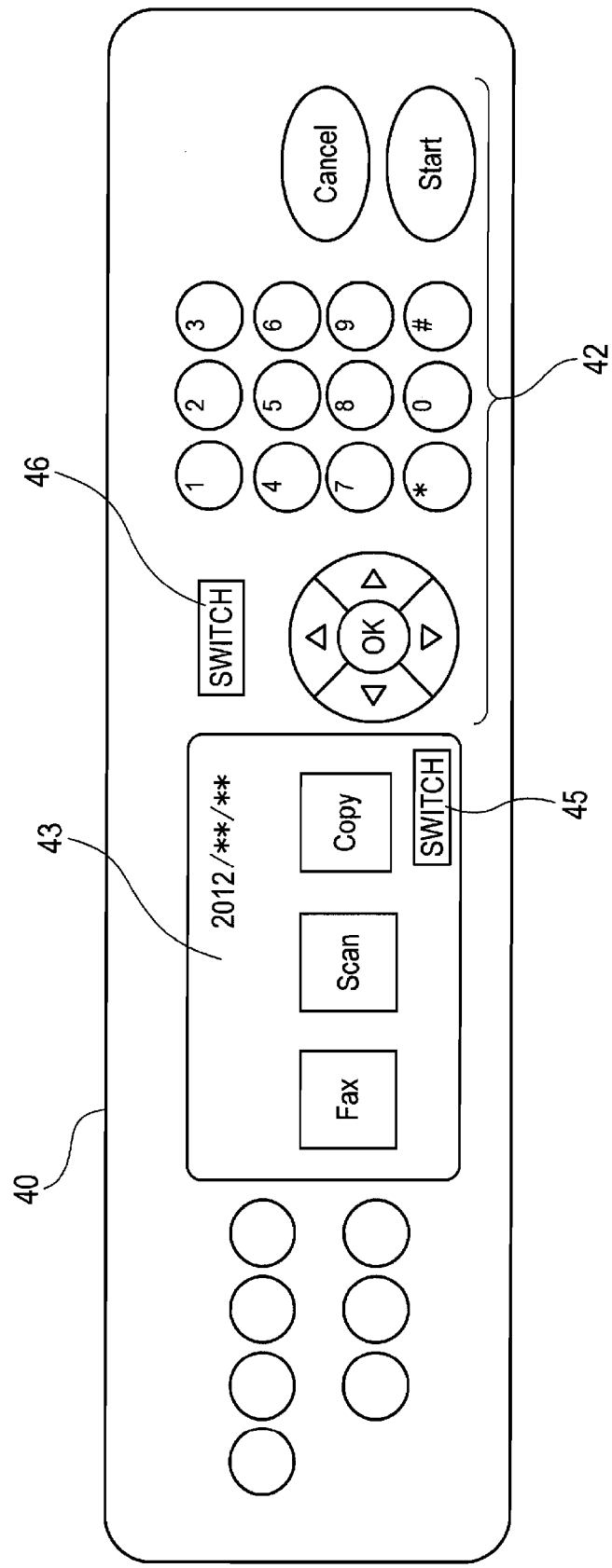
FIG. 2 is a view showing an example of a user interface section according to the first embodiment.

The MFP 100 includes a user interface section 40 on its front side. FIG. 2 is a view schematically showing a characteristic part of the user interface section 40 in FIG. 1. As shown in FIG. 2, the user interface section 40 is provided with a touch panel 43, a button group 42 (an example of an out-screen operating section) consisting of various buttons (for example, various buttons such as up, down, left, and right keys, a cancel key, ten keys, a switch key 46, etc.) and the like.

Figure 3:
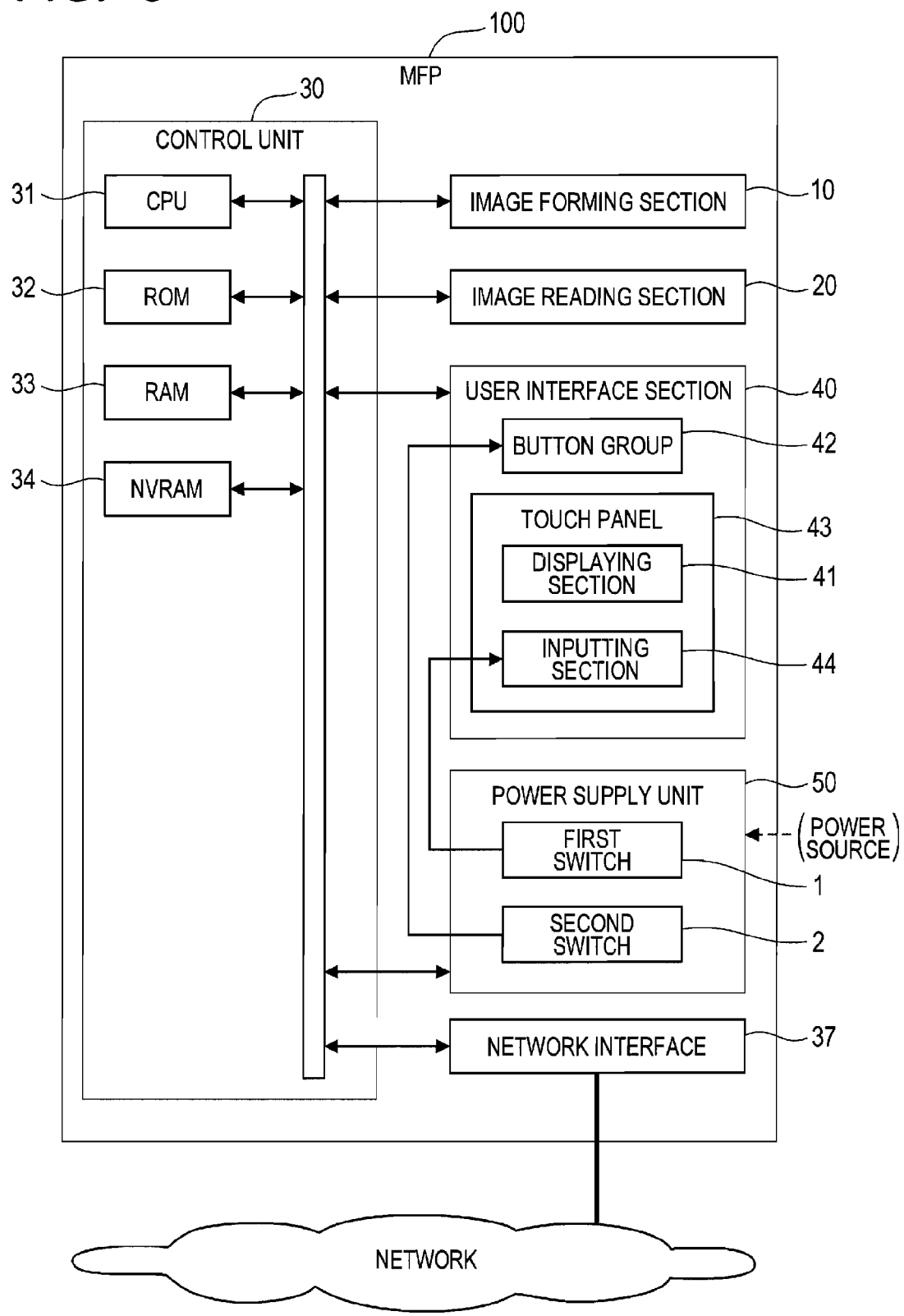
FIG. 3 is a block diagram showing the electrical configuration of the MFP according to the first embodiment.
Figure 4:
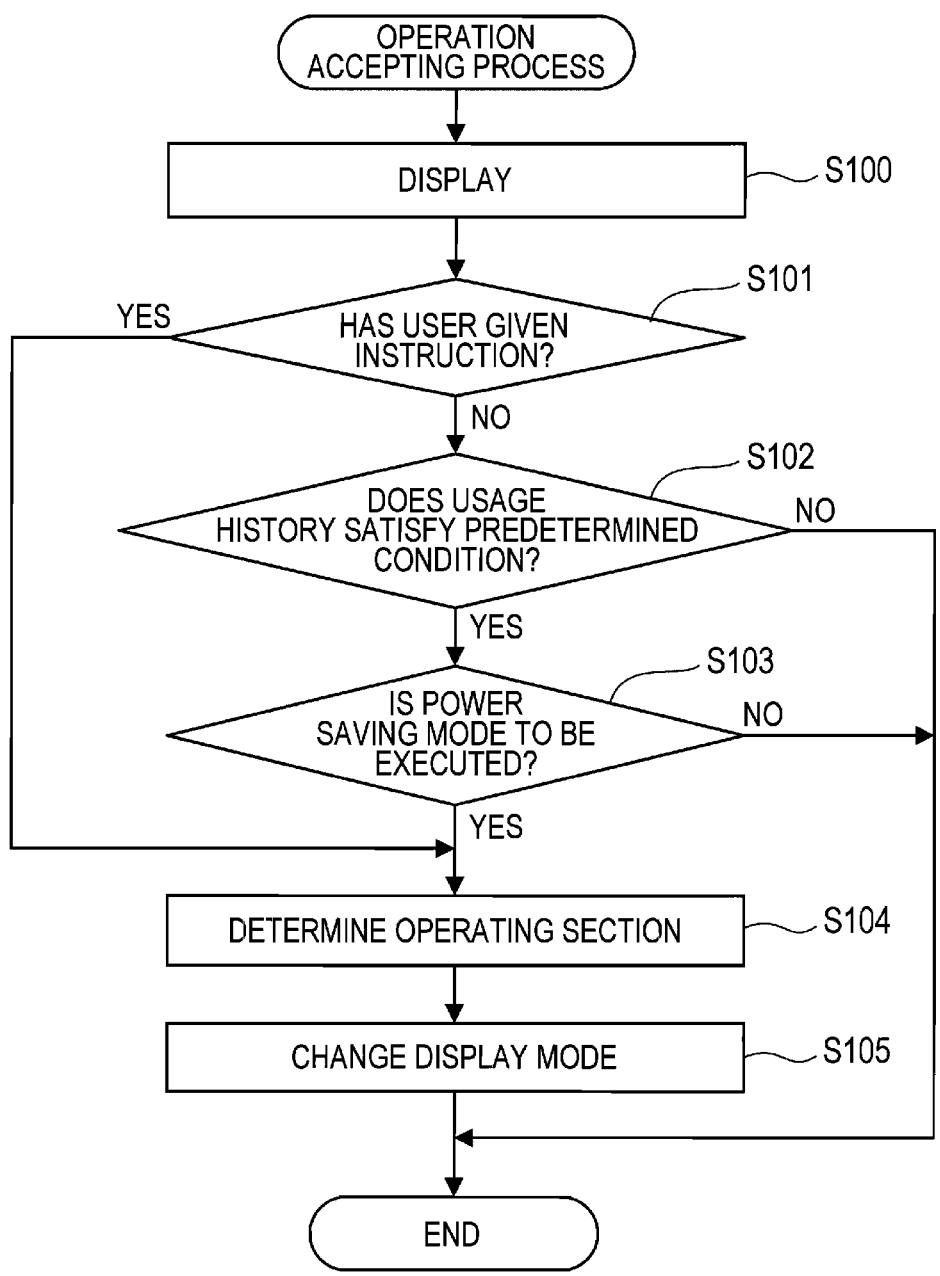
FIG. 4 is a flowchart showing the procedure of an operation accepting process according to the first embodiment.

As shown in FIG. 3, too, the touch panel 43 includes a displaying section 41 (an example of a displaying section) and an inputting section 44 (an example of an in-screen operating section). The inputting section 44 includes, for example, a capacitive touch sensor, and detects a touched position. A CPU 31 determines that a corresponding item displayed on the displaying section 41 has been selected, based on the position detected by the inputting section 44. In this way, the touch panel 43 can accept an input of a user's operation.

As described above, in the MFP 100, an operation screen can be displayed by the displaying section 41, and an input of a user's operation can be performed by the button group 42 and the inputting section 44 of the touch panel 43 serving as an operating section. The user interface section 40 including these elements will be described below in greater detail.

<Electrical Configuration of MFP>

Next, the electrical configuration of the MFP 100 will be described. As shown in FIG. 3, the MFP 100 includes a control unit 30 including the CPU 31 (an example of a controller), a ROM 32, a RAM 33, and a NVRAM (Non Volatile RAM) 34, Further, the control unit 30 is electrically connected to the image forming section 10, the image reading section 20, the user interface section 40, a power supply unit 50, and a network interface 37.

The ROM 32 stores a firmware which is a control program for controlling: the MFP 100, various settings, initial values, and the like. The RAM 33 and the NVRAM 34 are used as work areas from which various control programs are read out, or as storage areas in which read image data are temporarily stored.

The CPU 31 stores its processing results in the RAM 33 or the NVRAM 34 in accordance with the control program read out from the ROM 32 and with signals sent from various sensors, thereby controlling each component of the MFP 100.

The power supply unit 50 is electrically connected to the control unit 30 as well as the user interface section 40, and supplies or cuts off electric power to the control unit 30 and the user interface section 40. Further, a first switch 1 and a second switch 2, both serving as a switch, enable switching of supply or cut-off of electric power to the inputting section 44 of the touch panel 43 and to the button group 42 in the user interface section 40, respectively.

The network interface 37 is an interface that enables communications with other devices. The MFP 100 receives print data that are transmitted from another device, or transmits read image data to another device, via the network interface 37.

<Control of MFP>

Next, controls of the MFP 100 will be described. In the following embodiment, descriptions will be provided while taking the facsimile function, the scanner function, and the copy function of the MFP 100 as examples.

The facsimile function is a function of transmitting/receiving image data of an original document read by the image reading section 20 and image data sent from another facsimile device via a telephone line (not shown).

The scanner function is a function of transmitting image data of an original document read by the image reading section 20 to another device such as a PC via the network interface 37.

The copy function is a function of print, on a sheet, image data of an original document read by the image reading section 20, using the image forming section 10.

Note that the above-described functions are an example of functions of the MFP 100, and the functions are not limited to this example.

First, the user interface section 40 will be described. FIG. 2 is a view schematically showing a characteristic part of the user interface section 40. As shown in FIG. 2, in a standby screen in the displaying section 41 of the user interface section 40, for example, the functions of the MFP 100 are displayed as icons. When a user touches the "Copy" icon, for example, the inputting section 44 detects the touched position. Then, the CPU 31 determines that the "Copy" icon has been touched, and controls the displaying section 41 to start displaying an operation screen for performing settings for executing the copy function.

Additionally, for example, when the "Copy" icon displayed on the displaying section 41 is selected with an operation of the button group 42, too, the CPU 31 controls the displaying section 41 to start displaying the operation screen for executing the copy function.

Here, when an icon is selected with the button group 42, for example, each time the user presses the up, down, left, or right key of the button group 42, the CPU 31 controls the displaying section 41 to blink the icon, highlight the icon, or the like. Looking at this, the user can check which icon is currently selected. Then, when the user presses the OK key, the CPU 31 determines that selection of the icon has been confirmed.

Figure 5:
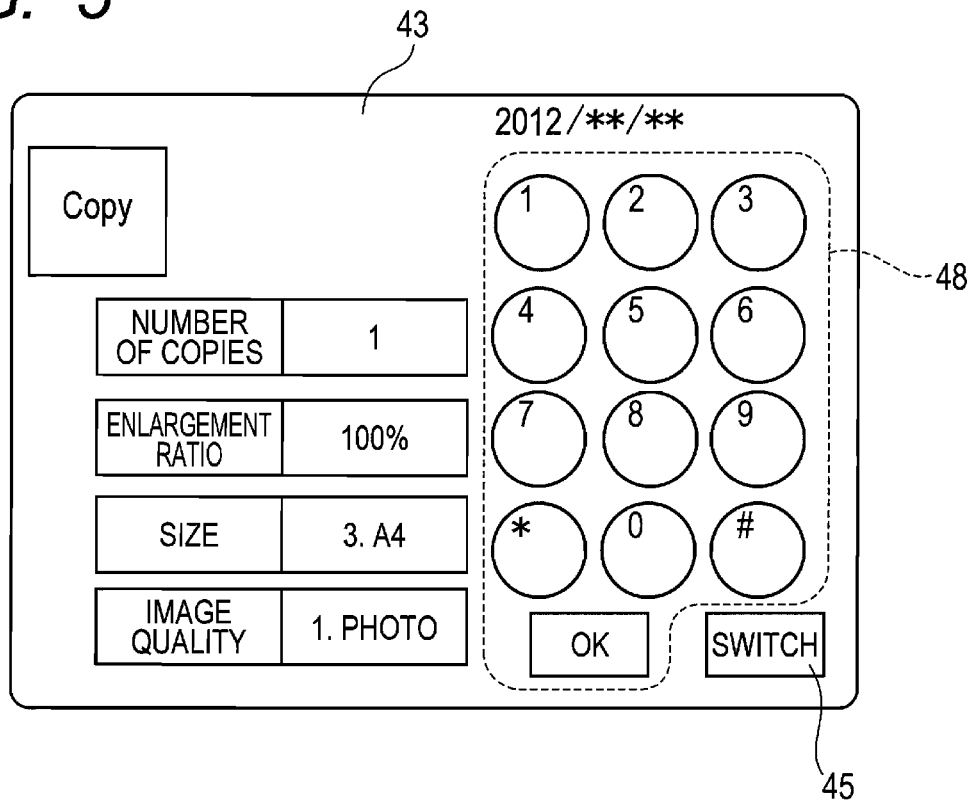
FIG. 5 is a view showing an example of a displaying section according to the first embodiment.

The user can perform the same operation both with the inputting section 44 of the touch panel 43 and with the button group 42. Further, the displaying section 41 displays an operation screen while appropriately changing a displayed content depending on an operation performed with the touch panel 43 or with the button group 42. For example, when the "Copy" function is selected on the standby screen, the displaying section 41 shifts to the next operation screen which is an operation screen for detailed settings of the copy function such as a number of copies, image quality, etc., as shown in FIG. 5 as an example.

Operation Accepting Process of Embodiment

Hereinafter, an operation accepting process of the embodiment will be described while referring to FIGS. 2 and 4-9.

The CPU 31 starts the operation accepting process of the present embodiment when the power supply unit 50 supplies the control unit 30 with electric power, and periodically executes the operation accepting process. The process flow will be described while referring to the flowchart FIG. 4.

Here, descriptions are provided assuming that, when electric power is initially supplied to the control unit 30, the operating section that can accept the user's operation is both the inputting section 44 of the touch panel 43 and the button group 42.

In S100, as described above, the displaying section 41 displays functions of the MFP 100 in the standby screen. Note that displaying in S100 is not limited to the standby screen but includes displaying an operation screen in which the displayed content of the operation screen is changed, as mentioned earlier.

In S101, the CPU 31 determines whether the user has given an instruction on the operating section that accepts the users operation.

For example, as shown in FIG. 2 as an example, the CPU 31 determines that the user has given an instruction on the operating section that accepts the user's operation, when a "Switch" icon 45 on the displaying section 41 or the "Switch" key 46 of the button group 42 has been pressed.

If the user has not given an instruction on the operating section that accepts the user's operation (S101: No), the CPU 31 proceeds to S102. In S102, the CPU 31 determines whether a usage history of the operating section satisfies a predetermined condition.

Here, the usage history of the operating section is a history showing which of the inputting section 44 of the touch panel 43 and the button group 42 was used in the past. The usage history is stored in storage areas such as the NVRAM 34 etc. It is determined that the predetermined condition is satisfied if a ratio of the number of times the inputting section 44 or the button group 42 was used to the number of times the operating sections were used in the past is greater than or equal to a certain percentage.

For example, assume that the predetermined certain percentage is 80 percent. If the ratio of the number of times the inputting section 44 of the touch panel 43 was used to the number of times the operating sections were used in the past is greater than or equal to 80 percent, based on the usage history in the past, it is determined that the predetermined condition is satisfied. If the usage ratio is less than 80 percent, it is determined that the predetermined condition is not satisfied. This determination may be performed with respect to the usage ratio of the button group 42.

In this way, if it is determined in S102 that the predetermined condition is not satisfied (S102: No), the operation accepting process ends. If it is determined that the predetermined condition is satisfied (S102: Yes), the CPU 31 proceeds to S103.

In S103, the CPU 31 determines whether to execute a power saving mode. Cases in which the power saving mode is to be executed are, for example, a case in which the user has given an instruction to shift to the power saving mode through an operation of the user interface section 40, a case in which an operation of the user interface section or a direction from another device such as facsimile reception etc. has not been received for a certain period or longer, or the like.

If the power saving mode is not executed (S103: No), the operation accepting process ends. If the power saving mode is executed (S103: Yes) or if in S101 the user has given an instruction on the operating section that accepts the user's operation (S101: Yes), the CPU 31 proceeds to S104.

In S104, the CPU 31 determines the operating section that accepts the user's operation, based on the determination results in S101-S103. To determine the operating section that accepts the user's operation is to determine the operating section that accepts the user's operation and to prohibit the operating section determined not to accept the user's operation from accepting the user's operation. First, a method of determining the operating section that accepts the user's operation will be described.

If the user has given an instruction in S101, the CPU 31 follows the instruction. For example, if the "Switch" icon 45 displayed on the displaying section 41 is touched, the CPU 31 determines that the button group 42 accepts the user's operation. If the "Switch" key 46 of the button group 42 is pressed, the CPU 31 determines that the inputting section 44 of the touch panel 43 accepts the user's operation.

If it is determined in S102 that the predetermined condition is satisfied (S102: Yes) and if it is determined in S103 that the power saving mode is to be executed (S103: Yes), the CPU 31 makes a determination based on the determination result in S102. That is, the CPU 31 determines that the user's operation is accepted by the operating section of which the usage ratio has been determined to satisfy the predetermined condition, based on the usage history in the past. For example, if the ratio of the number of times the inputting section 44 was used to the number of times the operating sections were used is greater than or equal to 80 percent, based on the usage history in the past, the CPU 31 determines that the inputting section 44 accepts the user's operation.

When the power saving mode is executed, it is undesirable from a viewpoint of saving power consumption that the both operating sections can accept the user's operation. In the present embodiment, it can be determined that the operating section having a higher usage ratio accepts the user's operation. Hence, the user's operation can be accepted at the operating section that is suitable for the user's usage status while saving power consumption, which improves convenience.

Here, it is determined in S102 whether the usage ratio of each operating section satisfies the predetermined condition, and it is determined in S103 whether the power saving mode is to be executed. However, it is not essential that the both steps in S102 and S103 are executed, but only one of the steps may be executed.

In a case where only S102 is executed, if it is determined in S102 that the usage history of the operating section satisfies the predetermined condition (S102: Yes), the CPU 31 proceeds to S104.

In a case where only S103 is executed, if in S101 the user does not give an instruction on the operating section that accepts the user's operation (S101: No), the CPU 31 proceeds to S103. In this case, when the operating section that accepts the user's operation is determined in S104, it is determined that the inputting section 44 of the touch panel 43 accepts the user's operation. Alternatively, the button group 42 may accept the user's operation. It is preliminarily set that either one of the operating sections accepts the user's operation.

Next, a description will be provided on a method of prohibiting the operating section determined not to accept the user's operation from accepting the user's operation.

The CPU 31 gives the power supply unit 50 an instruction to cut off power supply to the operating section determined not to accept the user's operation, that is, the inputting section 44 of the touch panel 43 or the button group 42, so that the user's operation is rejected. This saves power consumption.

Note that power supply to the inputting section 44 or the button group 42 may be continued (not cut of). In this case, even if the user operates the operating section determined not to accept the user's operation, the CPU 31 does not execute a process based on the user's operation, and the displaying section 41 does not display the operation screen that is obtained by shifting an operation screen or by changing a display content based on the user's operation, either.

Thus, even in a case where power supply to the inputting section 44 of the touch panel 43 or to the button group 42 is not cut off, power consumption can be saved by not executing a process based on a user's operation that is inputted at the operating section determined not to accept the user's operation or by keeping the display content of the operation screen unchanged.

Note that, if power supply to the operating section determined to accept the user's operation has been cut off, in S104 the CPU 31 gives the power supply unit 50 an instruction to supply electric power to the operating section that accepts the user's operation.

Subsequently, in S105, the CPU 31 changes a display mode in the displaying section 41. The display mode is changed depending on the operating section that accepts the user's operation which is determined in S104.

First, a change of the display mode will be described on a case where the operating section that accepts the user's operation is determined to be the inputting section 41 of the touch panel 43 in S104.

FIG. 5 is an example of a display of the displaying section 41 that is obtained when "Copy" is selected in the standby screen shown in FIG. 2 in a case where the inputting section 44 accepts the user's operation. When the inputting section 44 accepts the user's operation, the kind (type) of displayed icons and display sizes are changed. In order to do this, a displayed content and arrangement of icons are changed appropriately.

When the inputting section 44 accepts the user's operation, the user performs an operation with the touch panel 43. Thus, the CPU 31 changes displayed icons and their display sizes, and displays, in the displaying section 41, icons 48 corresponding to the ten keys and the OK key, for example, among the keys of the button group 42. Thus, the user's operations performed with the button group 42 can be performed with the inputting section 44 of the touch panel 43.

Note that, in FIG. 5, an example is shown in which the ten keys and the OK key are displayed as the icons 48 corresponding to the keys of the button group 42. However, an example of the icons 48 is not limited to this, and may be a start button and a cancel button, for example.

Figure 6:
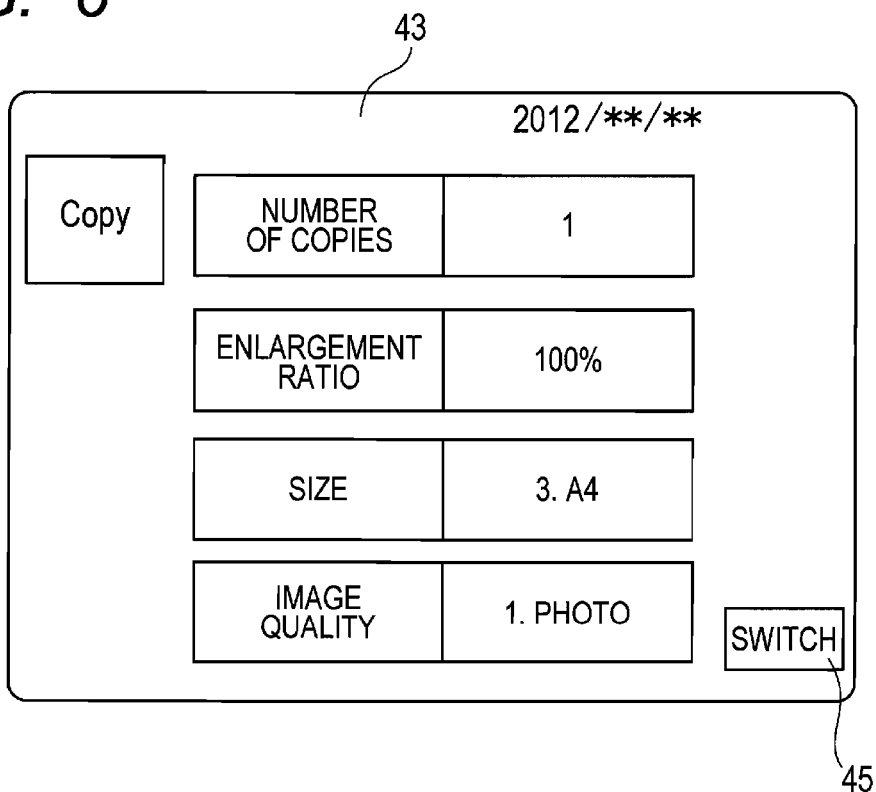
FIG. 6 is a view showing another example of the displaying section according to the first embodiment.
Figure 7:
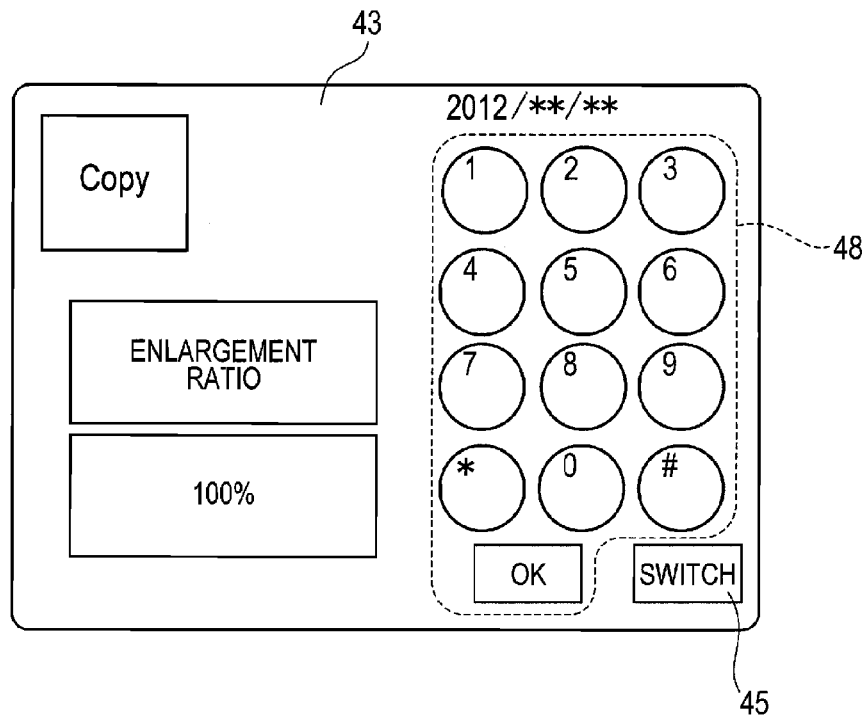
FIG. 7 is a view showing still another example of the displaying section according to the first embodiment.

Another display mode will be described. FIGS. 6 and 7 are an example of a display of the displaying section 41 that is obtained when "Copy" is selected in the standby screen shown in FIG. 2. Here, some of icons are made undisplayed and are displayed on another screen based on the user's operation.

First, in FIG. 6, the icons 48 corresponding to the keys of the button group 42 shown in FIG. 5 are made undisplayed. At this time, if an icon of enlargement ratio is touched, for example, the display shifts to a next operation screen such as shown in FIG. 7 as an example, where the icons 48 corresponding to the keys of the button group 42 are displayed. In other words, the CPU 31 changes the kind (type) of icons displayed on the displaying section 41, triggered by a touch operation on the icon of enlargement ratio.

This enables necessary contents to be displayed appropriately depending on the user's operation. Further, as shown in FIG. 7, the icons 48 corresponding to the keys of the button group 42 are displayed on another operation screen which is different from the operation screen in FIG. 6. Hence, compared with a case in which the icons 48 corresponding to the keys of the button group 42 are displayed on the same operation screen as shown in FIG. 5 described above, the size of display content such as icons can be made larger.

Note that the usable display mode in the MFP may be preliminarily set to either one of the display mode shown in FIG. 5 and the display mode shown in FIGS. 6 and 7. Alternatively, the display mode may be switchable to the both display modes. In case where the display mode is switchable to the both display modes in the MFP, it may be so configured that a display mode can be set for each user or for each function ("Fax", "Scan" etc.), for example, through an operation of the user interface section 40.

Also, the display mode may be switched depending on a function executed by the user. For example, if the copy function is selected, the icons 48 are displayed on the same operation screen as shown in FIG. 5 and, if the facsimile function is selected, the icons 48 are displayed on separate operation screens as shown in FIGS. 6 and 7.

Thus, depending on the function to be executed, the display mode can be changed for ease of user's operations.

Next, a change of the display mode will be described on a case where the operating section that accepts the user's operation is determined to be the button group 42 in S104.

Figure 8:
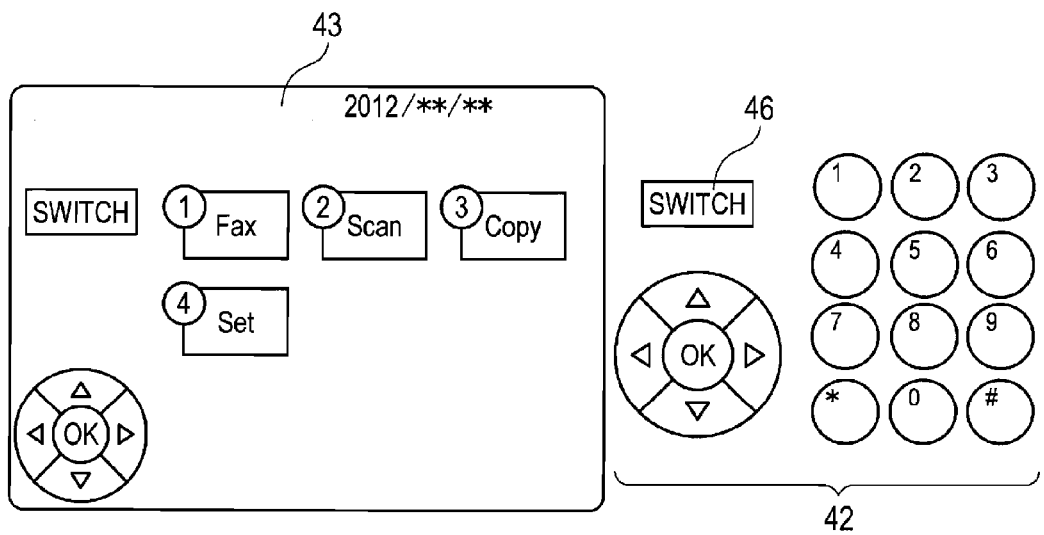
FIG. 8 is a partial view showing an example of the user interface section according to the first embodiment.

FIG. 8 is an example of a display of the displaying section 41 in the standby screen in a case where the button group 42 accepts the user's operation. Here, a change is made to display the correspondence relationship between the operation screen displayed on the displaying section 41 and the button group 42. As shown in FIG. 8, for example, the icons displayed on the displaying section 41 are arranged to correspond to arrangement of the ten keys of the button group 42.

Further, numbers corresponding to the ten keys are displayed on the respective icons, no that the user can see which of the ten keys should be pressed in order to perform a certain function. Here, a description is given on an example in which the icons are displayed so as to correspond to arrangement and numbers of the ten keys of the button group 42. However, the icons may be arranged to correspond to arrangement of keys other than the ten keys.

Figure 9:
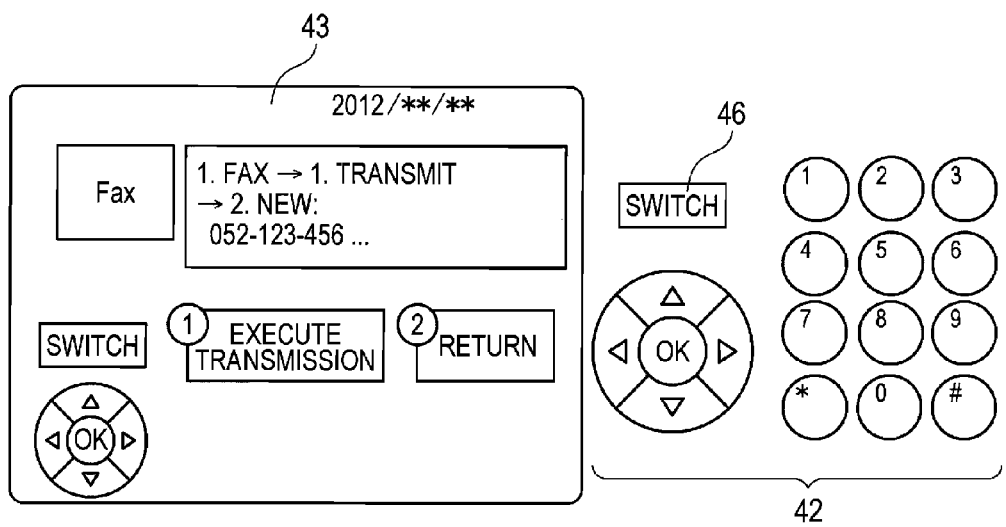
FIG. 9 is a partial view showing another example of the user interface section according to the first embodiment.

FIG. 9 is an example of a display of the displaying section 41 in a case where "Fax" is selected in the standby screen shown in FIGS. 2 and 8 and subsequently a few operations are performed. Here, a change is made to display, on the displaying section 41, a history of the user's operations that are performed through the button group 42.

As shown in FIG. 9, the history is displayed that "Fax" is selected with the ten key "1" of the button group 42, "Transmit" is selected with the ten key "1", "New" is selected with the ten key "2", and "052-123-456 . . . " is inputted.

That is, when the users operation is accepted by the button group 42, the history of the user's operation performed with the button group 42 is displayed on the displaying section 41, such as which key of the button group 42 is pressed, which item is currently inputted, or the like.

Due to these changes of the display mode, the user can perform operations sensuously although the displaying section 41 and the button group 42 serving as the operating section are physically separated. In addition, because the history of the user's operations performed with the button group 42 is displayed on the displaying section 41, an erroneous operation can be noticed immediately, which improves convenience.

Further, a display which is easily viewable for a user can be achieved, compared with the case where the inputting section 44 of the touch panel 43 accepts the user's operation. For example, compared with the case where the icons 48 corresponding to the button group 42 are displayed as shown in FIG. 5, the size of displayed contents and icons can be made larger because it is unnecessary to display the icons 48.

In addition, compared with the case where the icons 48 corresponding to the keys of the button group 42 are displayed on another operation screen based on the user's operation as shown in FIGS. 6 and 7, the number of times of screen transitions can be reduced.

Note that it is not essential both to display on the displaying section 41 the correspondence relationship between the operation screen and the button group 42, and to display the history of the user's operations performed with the button group 42. Only either one of changes of the display mode may be performed.

After the display mode is changed in S105 as described above, the operation accepting process ends.

According to the above-described embodiment, a user can operate through the both operating section of the inputting section 44 of the touch panel 43 and the button group 42, and can use either operating section depending on situations. Which operating section is to be used may be switched based on the user's operation, or may be switched depending on the usage status of the MFP 100 such as the past usage history, the power saving mode, or the like, which improves convenience.

Further, the display mode is changed depending on the operating section that accepts the user's operation. Hence, a display which is easily viewable can be achieved, and the user can perform operations without feeling inconvenience by switching the operating section.

Further, when the operating section is switched, an operation can be performed through either one of the operating sections. Hence, the user need not wonder which operating section to be operated among the plurality of operating sections, which improves convenience.

Note that, in the above-described embodiment, the users instruction in S101 refers to a case where an instruction is given through an operation of the inputting section 44 or the button group 42. However, the users instruction is not limited to this example. It can be also determined that the user has given an instruction on the operating section that accepts the user's operation, when the function instructed by the user is a particular function.

For example, because execution of the copy function involves various setting items such as a sheet size, image quality, color, layout, etc., there is a possibility that operations become complicated or that transitions of operation screens occur many times. Further, many users prefer to use ten keys for a function which is likely to require an input of numbers, like the facsimile function.

Like these, in a particular function that involves many setting items and many screen transitions, the operating section that accepts the user's operation may be set preliminarily. And, when the user gives an instruction to execute that function, the CPU 31 may determine the operating section by determining that the user has given an instruction on the operating section that accepts the user's operation.

In this case, in S104 as described earlier, especially when the inputting section 44 accepts the user's operation, the display mode can be changed depending on the function performed by the user. Hence, the user's operation can be accepted by the operating section that is easily operated by the user, and a display which is easily viewable can be achieved.

Note that a particular function that determines the operating section may be set preliminarily and stored in the RAM 33 or in the NVRAM 34, or may be settable by the user through the user interface section 40, for example. With this configuration, the operating section suitable for the function to be performed can be used without the user an instruction on the operating section that accepts the user's operation for each time of operations. This improves convenience.

Further, in the above-described embodiment, when power supply to the MFP 100 is started and the control unit 30 is supplied with electric power, both of the inputting section 44 and the button group 42 can accept the user's operation. However, it may be so configured that the operating section that accepts the user's operation is set preliminarily and, when the MFP 100 and the control unit 30 are supplied with electric power, either one of the operating sections accepts the user's operation. Here, if power supply to one of the operating sections is cut off, power consumption can be further saved.

Also, in the above-described embodiment, it is determined in S101 whether the user gives an instruction on the operating section that accepts the user's operation, it is determined in S102 whether the usage history of the operating section satisfies the predetermined condition, and it is determined in S103 whether the power saving mode is to be executed. However, the sequence between step S101 and step S102, S103 may be switched. Note that it has been already described that it is not essential to execute both of steps S102 and S103, and the sequence between S102 and S103 may be switched.

Further, it is not essential to execute both of step S101 and step S102 or S103, and only one of the steps may be executed. In a case where S102 is omitted, if the user does not give an instruction (S101: No), the operation accepting process ends. Here, if S103 is to be executed, the CPU 31 proceeds to S103. In a case where S101 is omitted, the CPU 31 proceeds to S102 subsequent to S100. Here, if S102 is omitted, the CPU 31 proceeds to S103.

Further, in the above-described embodiment, it is determined in S101 whether the user has given an instruction on the operating section that accepts the user's operation, it is determined in S102 whether the usage history satisfies the predetermined condition, and in S104 the operating section that accepts the user's operation is determined. With these steps, switching is performed from a state in which the user's operation can be accepted by the both operating sections of the inputting section 44 and the button group 42 to a state in which the users operation can be accepted by either one of the operating sections.

However, it may be so configured that in S104 the user's operation can be accepted by both of the button group 42 and the touch panel 43, if in S101 determination of the operating section that accepts the user's operation is cancelled, for example, through pressing of the cancel key of the button group 42 or through operations of the touch panel 43.

Note that a cancelling instruction of determination of the operating section is not limited to the user's instruction. For example, it may be determined that a cancelling instruction has been given, if a certain time period elapses after the operating section that accepts the user's operation is switched.

With this process, the user's operation can be accepted by both of the inputting section 44 and the button group 42. The operating section that accepts the user's operation is determined and switched if the user gives an instruction, if the usage history of the operating section satisfies the predetermined condition, and if the power saving mode is to be executed. And, if it is not necessary to switch the operating section, the user's operation can be again accepted by the both operating sections. Thus, usage adapted to the user's intention becomes possible, and this improves convenience.

Second Embodiment

An image forming, apparatus according to a second embodiment of the invention will be described while referring to FIGS. 10 through 15. In the second embodiment, the invention is applied to the MFP 100 which is similar to that in the first embodiment.

Here, the function and configuration of the MFP 100 of the second embodiment are the same as those in the first embodiment, except for a user interface section 600 and controls thereof. Thus, descriptions are omitted for matters other than the user interface section 600 and controls thereof.

<Configuration of the User Interface Section 600>

Figure 11:
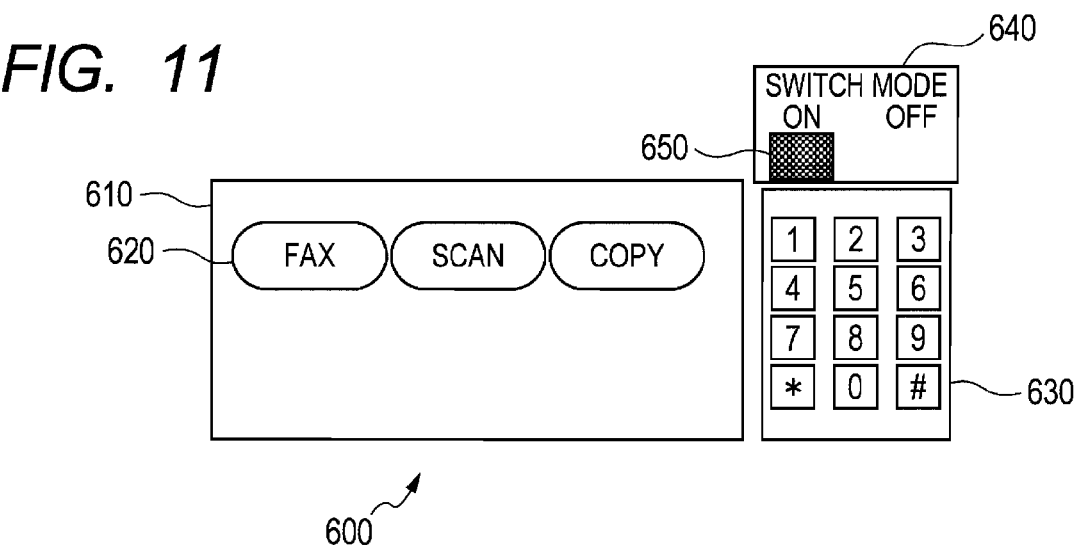
FIG. 11 is a partial view showing an example of a user interface section according to the second embodiment.

FIG. 11 is a view of the user interface section 600 of the MFP 100 according to the second embodiment.

As shown in FIG. 11, the user interface section 600 includes a touch panel 610, ten keys 630, and a switch 640. The touch panel 610 is capable of displaying icons 620 such as "FAX", "SCAN", "COPY", etc. and of detecting a position that is touched by a user. The ten keys 630 include numerical buttons of 1 through 9, 0 and symbol buttons of "*" and "#". The switch 640 switches modes between an "ON" mode in which the touch panel 610 accepts a touch, and an "OFF" mode in which the touch panel 610 rejects a touch.

Preferably, the switch 640 is a mechanical sliding switch that switches ON and OFF by moving a slider 650.

The MFP 100 performs predetermined functions based on user's instructions that are inputted through the user interface section 600.

<Control>

Hereinafter, operations of the MFP 100 will be described while referring to FIGS. 10 through 15, in a case where a user inputs an instruction to the user interface section 600.

Figure 10:
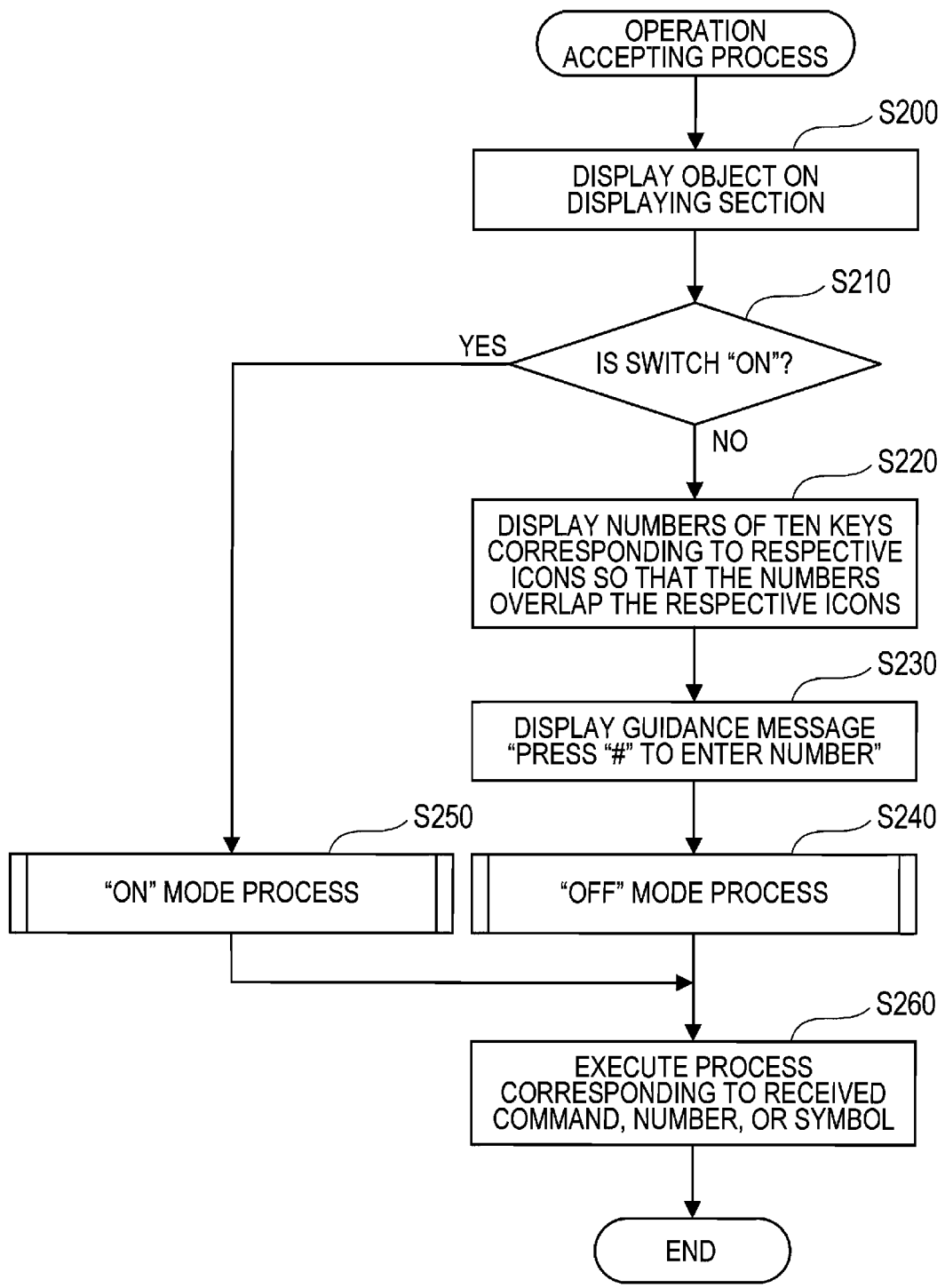
FIG. 10 is a flowchart showing the procedure of an operation accepting process according to a second embodiment of the invention.

In the present embodiment, the control unit 30 of the MFP 100 executes an operation accepting process in FIG. 10 when the MFP 100 is ready to accept an operation by the user.

First, in S200, the control unit 30 controls the touch panel 610 to display the objects (icons) 620 indicating functions that can be executed by the MFP 100. In the present embodiment, as shown in FIG. 11, three objects of "FAX", "SCAN", and "COPY" are displayed.

The user can learn that the MFP 100 is ready to accept the user's instruction through the user interface section 600 and can learn what kinds of instructions the MFP 100 can accept, by viewing the objects displayed on the touch panel 610.

Next, in S210, the control unit 30 determines whether the slider 650 of the switch 640 is located at the ON side or at the OFF side.

<"ON" Mode>

First, descriptions will be provided for the procedure of the "ON" mode which is a mode when the slider 650 of the switch 640 is located at the ON side (S210: Yes). Note that, as described above, the "ON" mode is a mode in which the touch panel 610 accepts a touch, that is, a mode in which both of the touch panel and the buttons accept an input.

When the slider 650 of the switch 640 is located at the ON side (S210: Yes), the control unit 30 calls a subroutine "ON mode process" in FIG. 14 to be described later (S250) by determining that the "ON" mode is selected in which the touch panel 610 accepts a touch. After that, in S260, the control unit 30 executes a process corresponding to a command, a number, or a symbol that is received through the subroutine "ON mode process".

Figure 14:
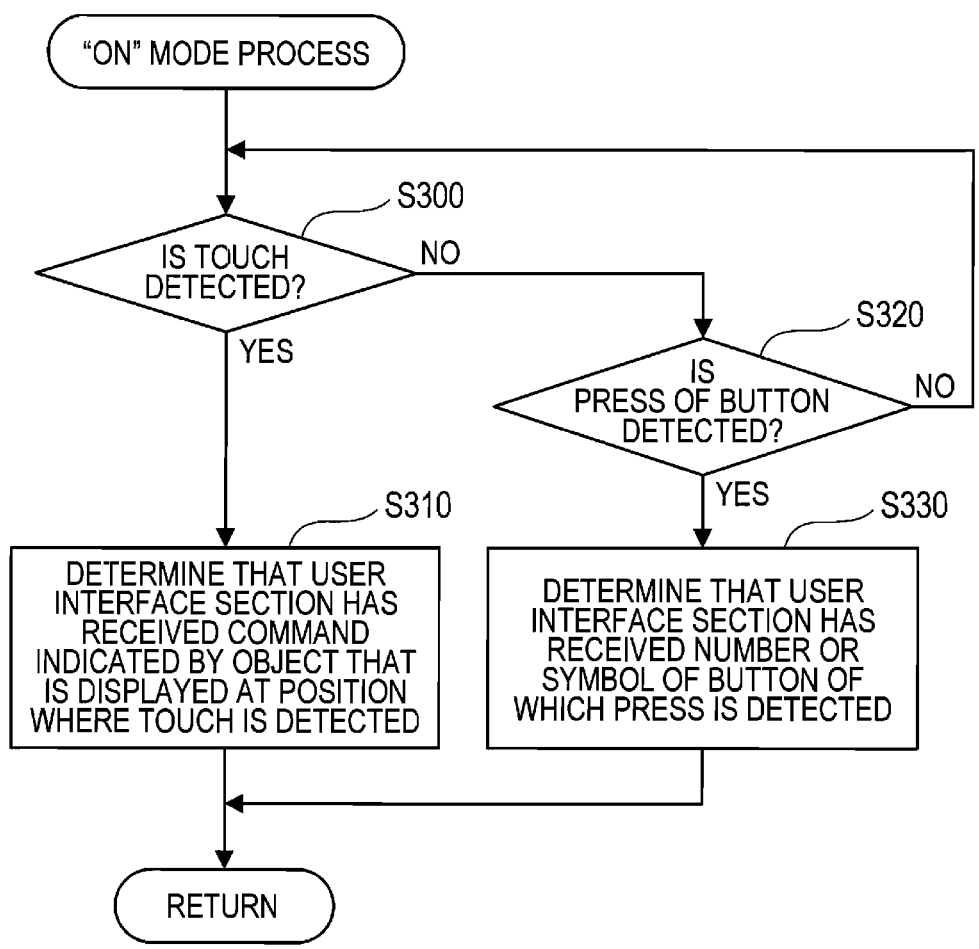
FIG. 14 is a flowchart showing the procedure of an "ON mode process" according to the second embodiment.

FIG. 14 is a flowchart showing the procedure of the subroutine "ON mode process". Note that this process is a process in which both of the touch panel and the buttons accept an input.

As shown in FIG. 14, in the subroutine "ON mode process", first, in S300 the control unit 30 determines whether the touch panel 610 detects a touch.

If the touch panel 610 detects a touch (S300: Yes), the control unit 30 determines that the user interface section 600 has received a command indicated by the object that is displayed at a position where a touch is detected (S310). For example, if the user has touched the position at which the "COPY" object is displayed, it is determined that the user interface section 600 has received a command for executing the copy function of the MFP 100.

Then, the control unit 30 returns the command to the "operation accepting process" routine in FIG. 10 which is the calling routine, and the process returns to the "operation accepting process" routine.

If the touch panel 610 does not detect a touch (S300: No), the control unit 30 checks whether the ten keys 630 detect a press of a button (S320).

If the ten keys 630 detect a press of a button (S320: Yes), the control unit 30 determines that the user interface section 600 has received the number or symbol of the button of which a press has been detected (S330). For example, if the user has pressed the button "1", the control unit 30 determines that the user interface section 600 has received the number 1.

Then, the control unit 30 returns the number or symbol to the "operation accepting process" routine in FIG. 10 which is the calling routine, and the process returns to the "operation accepting process" routine.

If the ten keys 630 do not detect a press of any button (S320: No), the control unit 30 returns to S300, and waits until a touch or a press of a button is detected while repeating the steps in S300 and S320.

<"OFF" Mode>

Next, descriptions will be provided for the procedure of "OFF" mode which is a mode when the slider 650 of the switch 640 is located at the OFF side (S210: No). Note that, as described above, the "OFF" mode is a mode in which the touch panel 610 rejects a touch, that is, a mode in which only the buttons accept an input.

When the slider 650 of the switch 640 is located at the OFF side (S210: No), in S220 the control unit 30 controls the touch panel 610 to display the numbers of the ten keys corresponding to the respective icons 620 so that the numbers overlap the respective icons 620 by determining that the "OFF" mode is selected in which the touch panel 610 rejects (does not accept) a touch.

Figure 12:
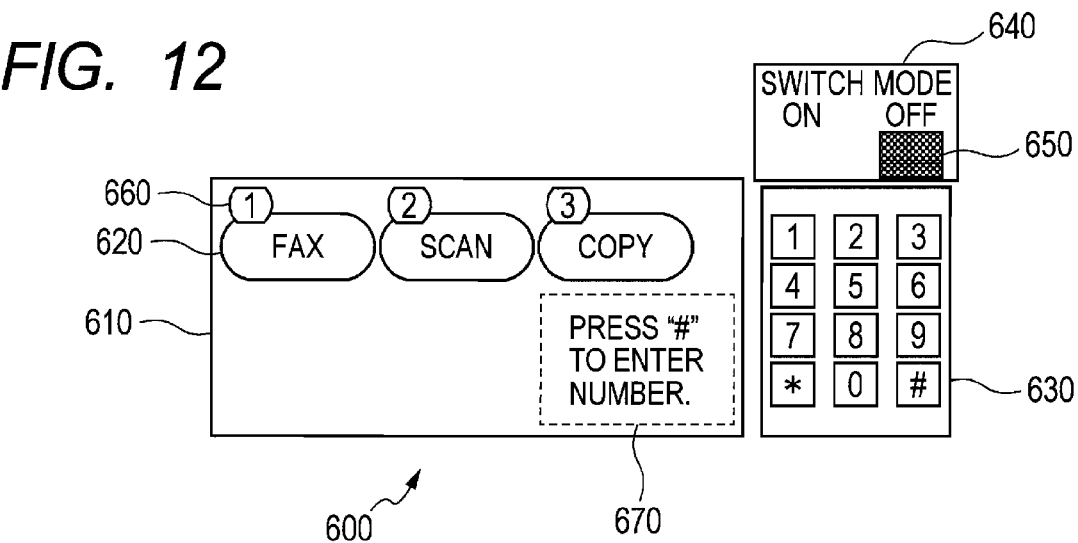
FIG. 12 is a partial view showing another example of the user interface section (a function selecting screen) according to the second embodiment.

FIG. 12 is a view showing a function selecting screen of the present embodiment. In the function selecting screen, "1" is displayed to overlap "FAX", "2" is displayed to overlap "SCAN", and "3" is displayed to overlap "COPY", respectively.

Figure 13:
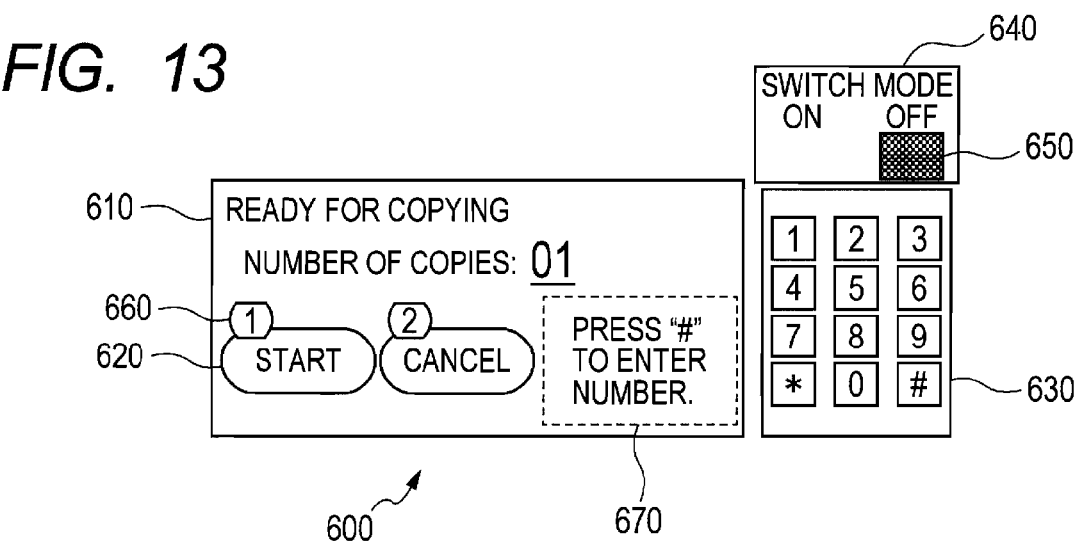
FIG. 13 is a partial view showing still another example of the user interface section (a copy operation screen) according to the second embodiment.

FIG. 13 is a view showing a copy operation screen which is displayed when the user inputs "3" in the function selecting screen of FIG. 12. In the copy operation screen, as shown in FIG. 13, "1" is displayed to overlap "START", and "2" is displayed to overlap "CANCEL", respectively.

Next, in S230, the control unit 30 controls the touch panel 610 to additionally display a guidance message "Press "#" to enter number."

By providing additional display as in S220 and S230, in the "OFF" mode, the user can understand which button of the ten keys 630 should be pressed in order to select an object displayed on the touch panel 610, and can understand that "#" should be pressed in order to input a number or symbol through the ten keys 630 as will be described later.

Next, in S250, the control unit 30 calls a subroutine "OFF mode process". After that, in S260, the control unit 30 executes a process corresponding to a command, a number, or a symbol that is received through the subroutine "OFF mode process".

FIG. 15 is a flowchart showing the procedure of the subroutine "OFF mode process". Note that this process is a process in which the touch panel rejects an input and only the buttons accept an input.

As shown in FIG. 15, in the subroutine "OFF mode process", first, in S400 the control unit 30 determines whether the ten keys 630 detect a press of a button.

If the ten keys 630 do not detect a press of a button (S400; No), the control unit 30 returns to S400 and waits until a press of a button is detected while repeating the step in S400.

If the ten keys 630 detect a press of a button (S400: Yes), the control unit 30 determines that the user interface section 600 has received the number or symbol of the button of which a press has been detected. For example, if the user has pressed the button "1", the control unit 30 determines that the user interface section 600 has received the number 1.

Next, in S410, the control 30 determines whether the button of which a press has been detected is "#".

If the button of which a press has been detected is not "#" (S410: No), in S440 the control unit 30 determines that the user interface section 600 has received a command indicated by the object associated with the same number or symbol of the button of which a press is detected. For example, if the user has pressed the button "3", the control unit 30 determines that the user interface section 600 has received a command for executing the copy function of the MFP 100, by determining that the user has selected the "COPY" object on which "3" is displayed in an overlapping manner.

Then, the control unit 30 returns the command to the "operation accepting process" routine in FIG. 10 which is the calling routine, and the process returns to the "operation accepting process" routine.

If the button of which a press has been detected is "#" (S410: Yes), in S420 the control unit 30 again determines whether the ten keys 630 detect a press of a button.

If the ten keys 630 do not detect a press of a button (S420: No), the control unit 30 returns to S420 and waits until a press of a button is detected, while repeating the step in S420.

If the ten keys 630 detect a press of a button (S420: Yes), in S430 the control unit 30 determines that the user interface section 600 has received the number or symbol of the button of which a press has been detected. For example, if the user has pressed the button "1", the control unit 30 determines that the user interface section 600 has received the number 1.

Then, the control unit 30 returns the number or symbol to the "operation accepting process" routine in FIG. 10 which is the calling routine, and the process returns to the "operation accepting process" routine.

As described above, according to the second embodiment, because selection of icons and inputting of numbers is switched with the "#" key, numbers can be inputted easily in the "OFF" mode.

For example, in the copy operation screen shown in FIG. 13, the user need to select "START" to start a copy, need to select "CANCEL" to cancel a copy, and need to input a number (value) to specify the number of copies.

At this time, in the "OFF mode process", it is determined that "START" is selected if a number "1" is inputted, and it is determined that the number of copies (value) "1" is inputted if "1" is pressed subsequent to "#". Hence, selection of the icons 620 and inputting of numbers can be easily switched and performed by using only the ten keys 630.

Further, the switch 640 is a mechanical sliding switch, not a touch panel. Thus, for example, when a user wishes to operate the MFP with a non-slip stall (fingerstall) on his/her finger, such as when the user makes photocopies of documents while turning pages one at a time, the user can easily operate the switch 640 with the non-slip stall on his/her finger to switch the mode from the "ON" mode to the "OFF" mode. Then, once the mode is switched to the "OFF" mode, the user can easily operate the MFP with the non-slip stall on his/her finger, which is convenient.

If the switch 640 was provided in a touch panel, it would be difficult to switch the mode unless the user puts off the non-slip stall.

While the invention has been described in detail with reference to the above aspects thereof, it would be apparent to those skilled in the art that various changes and modifications may be made therein without departing from the scope of the claims.

For example, the invention can be applied not only to an MFP but also to an apparatus as long as the apparatus includes both of an in-screen operating section (for example, a touch panel) and an out-screen operating section (for example, a button group) as the operating section.

Further, in the above-described embodiments, the single CPU 31 executes all of the operation accepting process. However, the invention is not limited to this configuration. The operation accepting process may be executed by a plurality of CPUs, an ASIC (Application Specific Integrated Circuit) which is a special circuit, or the like. For example, separate CPUs may execute determination of the Operating section, determination of the predetermined condition, instruction to cut off power supply, changing of the display mode, and the like.

What is claimed is:

1. An image forming apparatus comprising:
an image forming section configured to form an image on a sheet;
a displaying section configured to display an operation screen for image formation performed by the image forming section;
an in-screen operating section configured to accept an operation inside the operation screen displayed by the displaying section;
an out-screen operating section configured to accept the operation outside the operation screen displayed by the displaying section; and
a controller configured to:
in response to a first instruction, determine the out-screen operating section as an operating section that accepts the operation and determine the in-screen operating section as an operating section that rejects the operation; and
in response to a second instruction, determine the in-screen operating section as the operating section that accepts the operation and determine the out-screen operating section as an operating section that rejects the operation.

2. The image forming apparatus according to claim 1, wherein the controller is configured to change a kind of an icon displayed on the displaying section depending on the operating section that accepts the operation.

3. The image forming apparatus according to claim 2, wherein the controller is configured to change a size of the icon displayed on the displaying section.

4. The image forming apparatus according to claim 1, wherein, when the in-screen operating section accepts the operation, the controller is configured to change a kind of an icon displayed on the displaying section, a change of the kind of the icon being triggered by an acceptance of a predetermined operation by the in-screen operating section.

5. The image forming apparatus according to claim 1, wherein, when the out-screen operating section accepts the operation, the controller is configured to display, on the displaying section, a history of the operation accepted by the out-screen operating section.

6. The image forming apparatus according to claim 1, wherein, when the out-screen operating section accepts the operation, the controller is configured to display, on the displaying section, a correspondence relationship between the operation screen and the out-screen operating section.

7. The image forming apparatus according to claim 1, wherein the controller is configured to cut off power supply to the operating section that rejects the operation.

8. The image forming apparatus according to claim 1, wherein the controller is configured to determine whether a usage history of the operating section satisfies a predetermined condition and, based on a determination result, to determine the operating section that accepts the operation.

9. The image forming apparatus according to claim 1, wherein the controller is configured to determine whether to execute a power saving mode and, based on a determination result, to determine the operating section that accepts the operation.

10. The image forming apparatus according to claim 1, wherein the out-screen operating section comprises a plurality of buttons; and
wherein the controller is configured to:
determine whether a pressed button is a predetermined button of the plurality of buttons, and
if the pressed button is other than the predetermined button, determine that a command is received, the command being indicated by an object associated with a same number or symbol of the pressed button, and
if the pressed button is the predetermined button, wait until a press of a button is detected, and determine that a number or symbol indicated by a button of which the press is detected is received.

11. An image forming apparatus comprising:
an image forming section configured to form an image on a sheet;
a displaying section configured to display an operation screen for image formation performed by the image forming section;
an in-screen operating section configured to accept an operation inside the operation screen displayed by the displaying section;
an out-screen operating section configured to accept the operation outside the operation screen displayed by the displaying section; and
a controller configured to:
when a usage ratio of the in-screen operating section is higher than a usage ratio of the out-screen operating section, determine the in-screen operating section as an operating section that accepts the operation and determine the out-screen operating section as an operating section that rejects the operation; and
when a usage ratio of the out-screen operating section is higher than the usage ratio of the in-screen operating section, determine the out-screen operating section as the operating section that accepts the operation and determine the in-screen operating section as the operating section that rejects the operation,
wherein the usage ratio of the in-screen operating section is a ratio of a number of times the in-screen operating section is used to a number of times the in-screen and out-screen operating sections are used; and
wherein the usage ratio of the out-screen operating section is a ratio of a number of times the out-screen operating section is used to a number of times the in-screen and out-screen operating sections are used.

12. The image forming apparatus according to claim 11, wherein the out-screen operating section comprises a plurality of buttons; and
wherein the controller is configured to:
determine whether a pressed button is a predetermined button of the plurality of buttons, and
if the pressed button is other than the predetermined button, determine that a command is received, the command being indicated by an object associated with a same number or symbol of the pressed button, and
if the pressed button is the predetermined button, wait until a press of a button is detected, and determine that a number or symbol indicated by a button of which the press is detected is received.

13. An image forming apparatus comprising:
an image firming section configured to form an image on a sheet;
a displaying section configured to display an operation screen for image formation performed by the image forming section;
an in-screen operating section configured to accept an operation inside the operation screen displayed by the displaying section;
an out-screen operating section configured to accept the operation outside the operation screen displayed by the displaying section; and
a controller configured to, in a power saving mode:
when the in-screen operating section is preliminarily set to be used in the power saving mode, determine the in-screen operating section as an operating section that accepts the operation and determine the out-screen operating section as an operating section that rejects the operation; and
when the out-screen operating section is preliminarily set to be used in the power saving mode, determine the out-screen operating section as the operating section that accepts the operation and determine the in-screen operating section as the operating section that rejects the operation.

14. The image forming apparatus according to claim 13, wherein the out-screen operating section comprises a plurality of buttons; and
wherein the controller is configured to:
determine whether a pressed button is a predetermined button of the plurality of buttons, and
if the pressed button is other than the predetermined button, determine that a command is received, the command being indicated by an object associated with a same number or symbol of the pressed button, and
if the pressed button is the predetermined button, wait until a press of a button is detected, and determine that a number or symbol indicated by a button of which the press is detected is received.

15. The image forming apparatus according to claim 1, wherein the displaying section is configured to display a switch icon in the operation screen,
wherein the out-screen operating section comprises a switch key; and
wherein the controller is configured to:
determine that the first instruction is received when the in-screen operating section accepts the operation by the switch icon, and determine that the second instruction is received when the switch key of the out-screen operating section accepts the operation.

\* \* \* \* \*